US012319058B2

(12) United States Patent
Tsukamoto

(10) Patent No.: US 12,319,058 B2
(45) Date of Patent: Jun. 3, 2025

(54) LIQUID EJECTION RECORDING ELEMENT UNIT AND METHOD FOR PRODUCING SAME

(71) Applicant: CANON KABUSHIKI KAISHA, Tokyo (JP)

(72) Inventor: Naoya Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 18/128,070

(22) Filed: Mar. 29, 2023

(65) Prior Publication Data

US 2023/0311505 A1 Oct. 5, 2023

(30) Foreign Application Priority Data

Mar. 30, 2022 (JP) ................................ 2022-056073

(51) Int. Cl.
*B41J 2/14* (2006.01)

(52) U.S. Cl.
CPC ......... *B41J 2/14024* (2013.01); *B41J 2/1404* (2013.01); *B41J 2/14145* (2013.01); *B41J 2002/14362* (2013.01); *B41J 2002/14419* (2013.01)

(58) Field of Classification Search
CPC .. B41J 2/14024; B41J 2/1404; B41J 2/14145; B41J 2002/14362; B41J 2002/14419
See application file for complete search history.

(56) References Cited

U.S. PATENT DOCUMENTS 10,442,202 B2 * 10/2019 Fukumoto .............. B41J 2/1623
11,305,539 B2 * 4/2022 Yonemoto .............. B41J 2/1632

FOREIGN PATENT DOCUMENTS

JP 06-218923 A 8/1994
JP 07-266567 A 10/1995

* cited by examiner

*Primary Examiner* — Geoffrey S Mruk
(74) *Attorney, Agent, or Firm* — Venable LLP

(57) ABSTRACT

A liquid ejection recording element unit includes a first substrate provided with a first partition wall that demarcates a first flow channel including an ejection port of a liquid and an energy generating portion that generates energy for ejecting the liquid from the first flow channel; and a second substrate provided with a second partition wall that demarcates a second flow channel including a supply port of the liquid, the second substrate being stacked on the first substrate, so that the second flow channel communicates with the first flow channel. The first partition wall and the second partition wall are contiguous across a predetermined gap in the stacking direction of the first substrate and the second substrate. A hydraulic diameter of the gap is shorter than a hydraulic diameter of a smallest flow channel portion having a minimum flow channel cross-sectional area in the first flow channel.

12 Claims, 12 Drawing Sheets

TABLE 1: FLOW CHANNEL PORTIONS 19 (SQUARE CROSS SECTION)

| OPENING WIDTH [μm] | 85 | 80 | 65 | 60 |
|---|---|---|---|---|
| CROSS-SECTIONAL AREA A | 7225 | 6400 | 4225 | 3600 |
| WET EDGE LENGTH S | 340 | 320 | 260 | 240 |
| dh1 | 85 | 80 | 65 | 60 |

FIG. 9C TABLE 2: GAP 61 (FACING DISTANCE × DEPTH 25000 μm)

| FACING DISTANCE [μm] | 25 | 20 | 15 | 10 | 5 | 1 | 2 | 3 | 4 |
|---|---|---|---|---|---|---|---|---|---|
| CROSS-SECTIONAL AREA A | 625000 | 500000 | 375000 | 250000 | 125000 | 25000 | 50000 | 75000 | 100000 |
| WET EDGE LENGTH S | 50050 | 50040 | 50030 | 50020 | 50010 | 50002 | 50004 | 50006 | 50008 |
| dh2 | 50.0 | 40.0 | 30.0 | 20.0 | 10.0 | 2.0 | 4.0 | 6.0 | 8.0 |

LIQUID EJECTION RECORDING ELEMENT UNIT AND METHOD FOR PRODUCING SAME

BACKGROUND OF THE INVENTION

Field of the Invention

The present invention relates to a liquid ejection recording element unit and to a production method thereof.

Description of the Related Art

Inkjet printers are output devices that form characters and images through ejection of small droplets of ink, as a recording liquid, from an inkjet recording head as a liquid ejection recording head. In recent years, inkjet printers have come to be used as home and office equipment, and have spread also to industrial applications. Such an inkjet recording head is formed through high-precision joining of a recording element unit to a support member that is connected to an ink supply unit. The recording element unit is formed through electrical mounting of a recording element substrate, in which a plurality of ejection energy generating portions, ink flow channels and ink ejection ports are formed in a silicon substrate, an ejection signal output portion such as a drive IC, and a wiring board that transmits electrical signals from a printer body. In this respect, one method for forming ink flow channels in a recording element unit involves affixing a plurality of substrates. Japanese Patent Application Publication No. H06-218923 describes a technique for preventing the loss of ink ejection driving power, on account of a spreading adhesive, by providing a depressed portion through which ink does not pass at a bonding surface, in the formation of ink flow channels by joining. Further, Japanese Patent Application Publication No. H07-266567 proposes a technique in which, for the purpose of improving workability and yield, an adhesive is filled into a depressed portion formed on a bonding surface, after which substrates are bonded together, to form flow channels.

SUMMARY OF THE INVENTION

With regard to inkjet recording heads, recent years have witnessed ongoing progress in shrinkage of recording element substrates for further reducing product costs, as well as progress in component size reduction aimed at enhancing performance. Ink flow channels in a recording element unit need to be made yet finer, and pitches narrower, in order to meet these product requirements. On the other hand, joining regions are smaller in a case where ink flow channels are formed through joining of a plurality of substrates on which a relief is formed. Herein ink flow channels themselves become narrower, and thus likelier to be blocked, on account of adhesive spread. When addressing this issue by simply adopting the techniques in Japanese Patent Application Publication Nos. H06-218923 and H07-266567 a concern arises in that the chip surface area expands on account of the formation of depressed portions that do not function as ink flow channels.

It is thus an object of the present invention to provide a technique that allows suppressing blockage of ink flow channels caused by adhesive spread, without incurring an enlargement in chip surface area.

In order to attain the above goal, the liquid ejection recording element unit of the present invention includes:

a first substrate having a first partition wall, and an energy generating portion, such that the first partition wall demarcates a first flow channel including a plurality of ejection ports for ejection of a liquid for image recording, and the energy generating portion generates energy for ejecting the liquid from the first flow channel, via the ejection ports; and a second substrate provided with a second partition wall that demarcates a second flow channel including a supply port for supplying the liquid, the second substrate being stacked on and joined to the first substrate, via an adhesive, so that the second flow channel communicates with the first flow channel;

wherein the first partition wall and the second partition wall are contiguous across a gap of a predetermined facing distance, with no interposed adhesive, in the stacking direction of the first substrate and the second substrate; and wherein a hydraulic diameter of the gap is smaller than a hydraulic diameter of a smallest flow channel portion having a minimum flow channel cross-sectional area in the first flow channel.

In order to attain the above goal, a method for producing a liquid ejection recording element unit of the present invention includes:

the liquid ejection recording element unit including:

a first substrate having a first partition wall, and an energy generating portion, such that the first partition wall demarcates a first flow channel including a plurality of ejection ports for ejection of a liquid for image recording, and the energy generating portion generates energy for ejecting the liquid from the first flow channel, via the ejection ports; and a second substrate provided with a second partition wall that demarcates a second flow channel including a supply port for supplying the liquid, the second substrate being stacked on and joined to the first substrate, via an adhesive, so that the second flow channel communicates with the first flow channel; the method comprising:

a substrate production step of producing the first substrate and the second substrate; and a stacking step of stacking the first substrate and the second substrate through joining via an adhesive;

wherein in the stacking step, the first substrate and the second substrate are stacked so that no adhesive is applied onto a gap between the first partition wall and the second partition wall that are contiguous in the stacking direction of the first substrate and the second substrate, and a hydraulic diameter of the gap is smaller than a hydraulic diameter of a smallest flow channel portion having a minimum flow channel cross-sectional area in the first flow channel.

The present invention allows suppressing blockage of ink flow channels caused by adhesive spread, without incurring an enlargement in chip surface area.

Further features of the present invention will become apparent from the following description of exemplary embodiments with reference to the attached drawings.

BRIEF DESCRIPTION OF THE DRAWINGS

FIG. 9A to FIG. 9C are diagrams for explaining a hydraulic diameter in ink flow channels in Embodiment 1 of the present invention.

DESCRIPTION OF THE EMBODIMENTS

Implementations for carrying out the present invention will be explanatorily described in detail below on the basis of embodiments, with reference to accompanying drawings. The dimensions, materials, shapes, relative arrangement and so forth of the constituent components described in the embodiments are to be modified as appropriate depending on the configuration of the apparatus to which the invention is to be applied, and on various conditions. Moreover, not all combinations of features explained in the present embodiments are necessarily essential as a solution of the problem of the invention. The constituent elements described in the embodiments are merely illustrative in character, and the scope of the invention is not meant to be limited to these constituent elements alone.

Figure 1A:
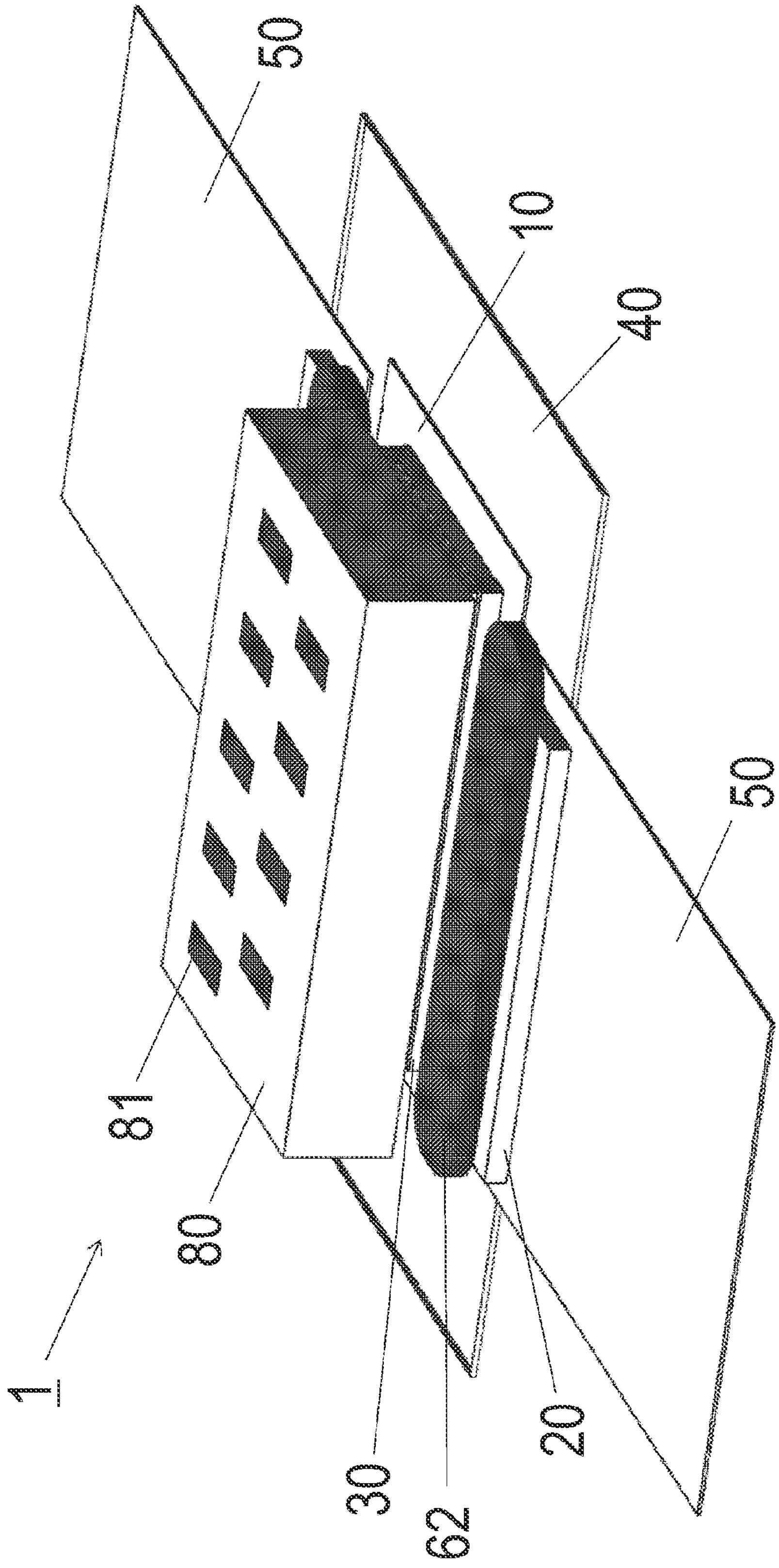
FIG. 1A is a schematic perspective-view diagram of a liquid ejection recording element unit in an embodiment of the present invention.
Figure 1B:
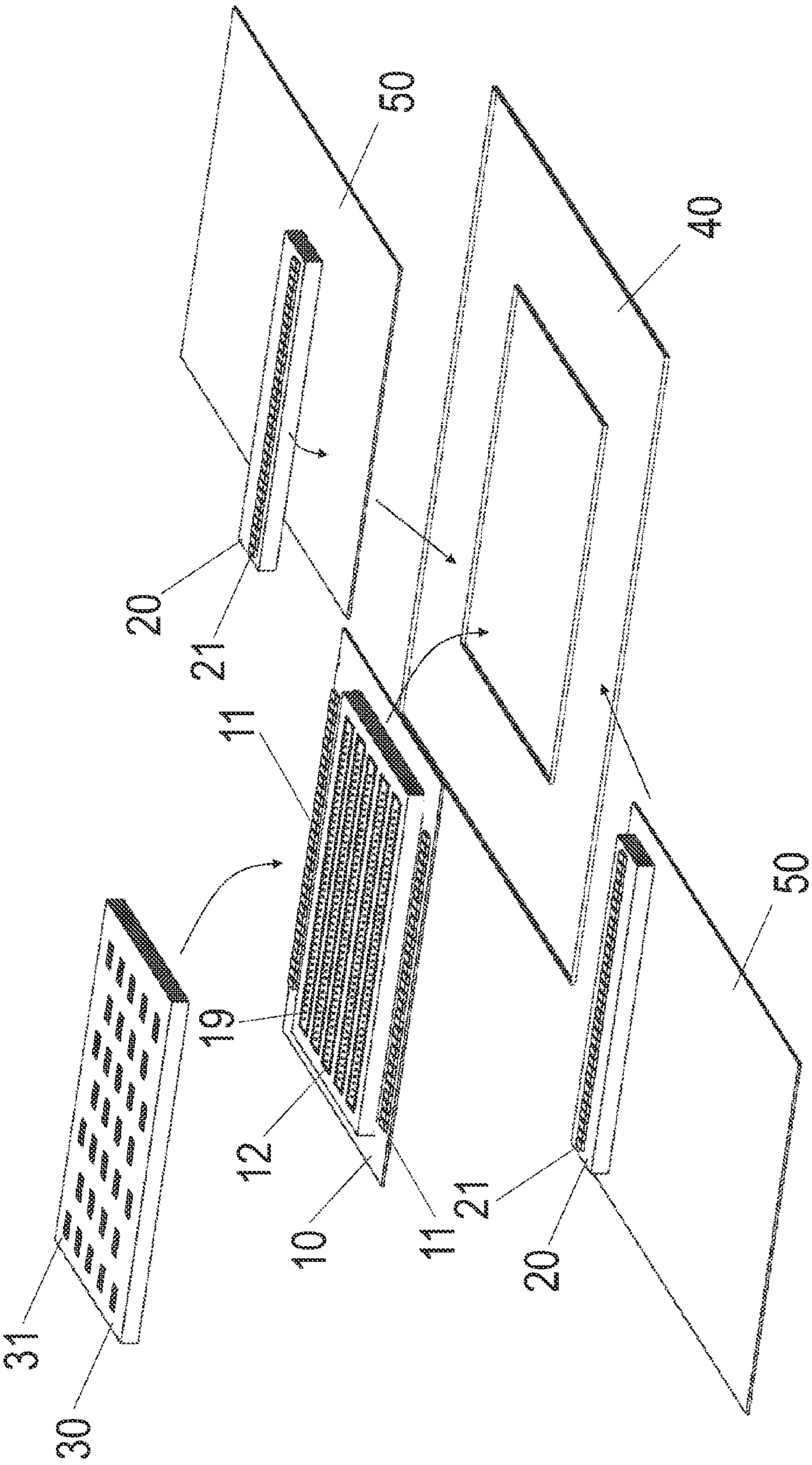
FIG. 1B is a schematic perspective-view diagram illustrating a production process of a liquid ejection recording element unit.
Figure 1C:
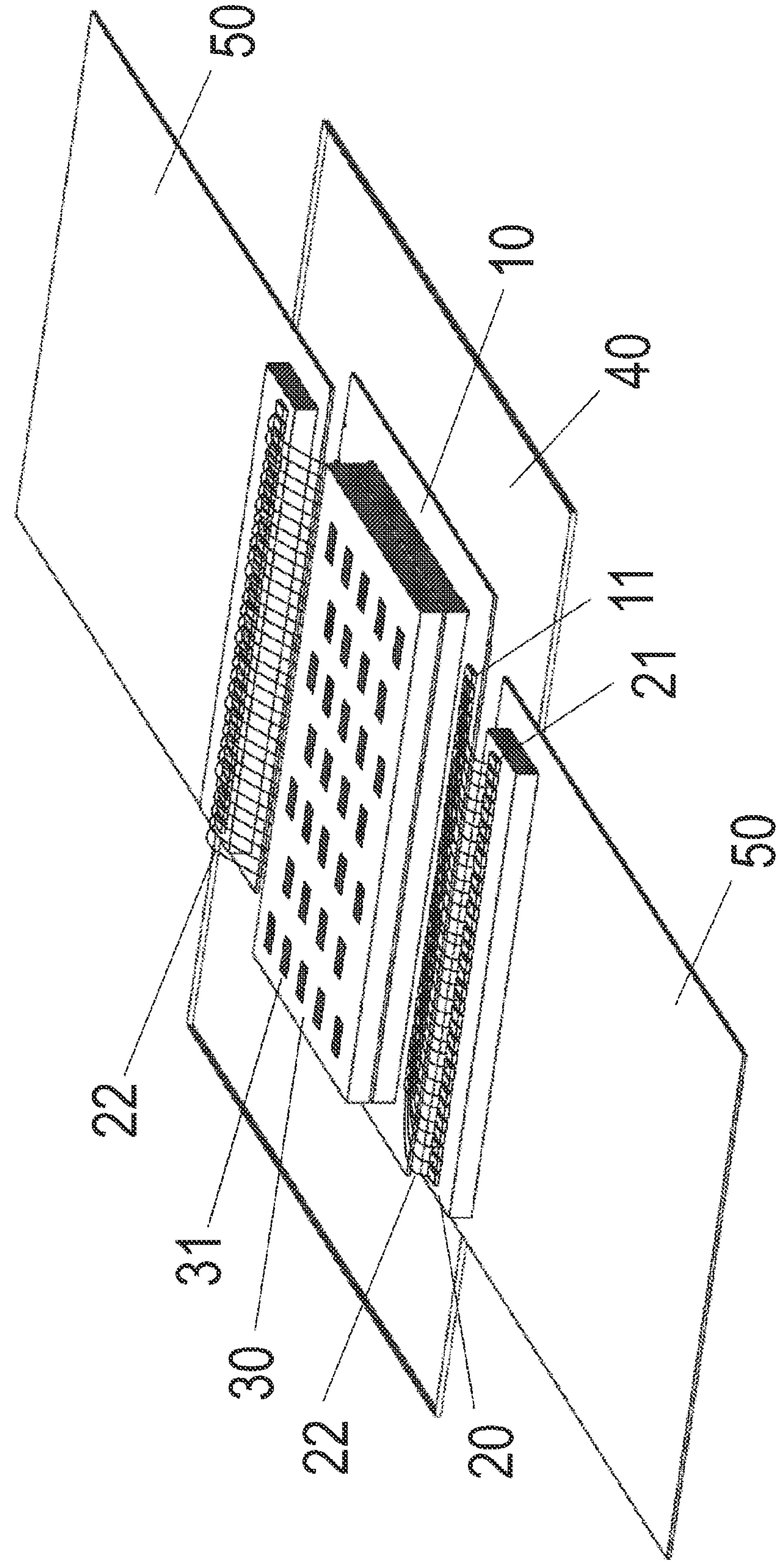
FIG. 1C is a schematic perspective-view diagram illustrating a production process of a liquid ejection recording element unit.
Figure 1D:
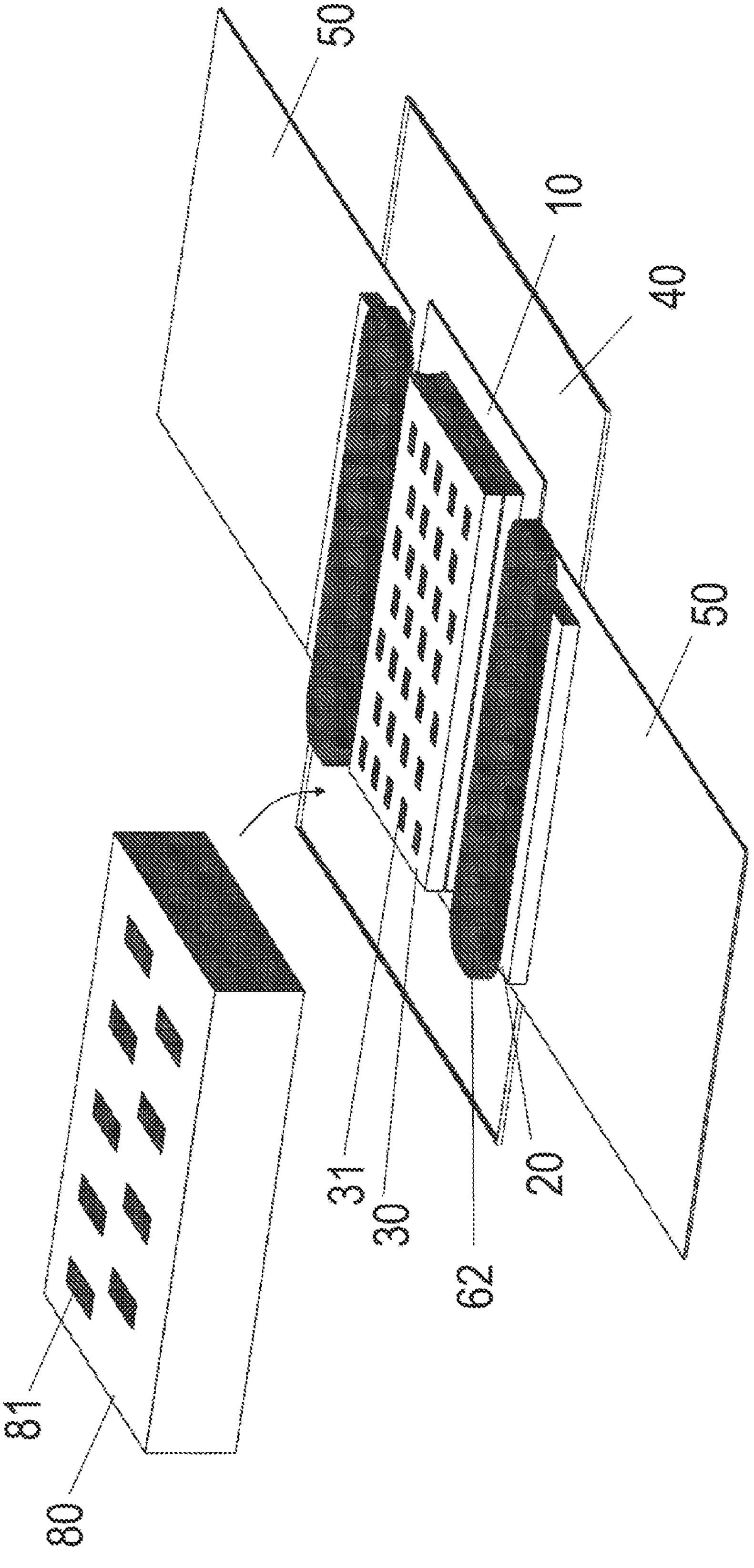
FIG. 1D is a schematic perspective-view diagram illustrating a production process of a liquid ejection recording element unit.

An explanation follows next, with reference to FIG. 1A to FIG. 1D, on an overview of the configuration of a liquid ejection recording unit according to an embodiment of the present invention, together with an explanation of a production process (production method) of the liquid ejection recording unit. FIG. 1A is a schematic diagram illustrating a liquid ejection recording element unit according to an embodiment of the present invention. FIG. 1B, FIG. 1C and FIG. 1D are schematic diagrams illustrating the production process of the liquid ejection recording element unit.

A liquid ejection recording element unit 1 (hereafter referred to as recording element unit 1) according to an embodiment of the present invention illustrated in FIG. 1A is used in a liquid ejection head of a liquid ejection device that is provided in a liquid ejection type recording apparatus typified by an inkjet printer. In an inkjet printer, the liquid ejection head is configured in the form of an inkjet recording head that is used to record a desired image on a recording material through ejection of ink, as an image recording liquid, onto the recording material. In the recording apparatus there is also provided an ink tank as a liquid storage portion that accommodates a liquid that is supplied to the liquid ejection head, and a transport mechanism of a recording material such as a sheet that is an object to be recorded on.

Figure 3A:
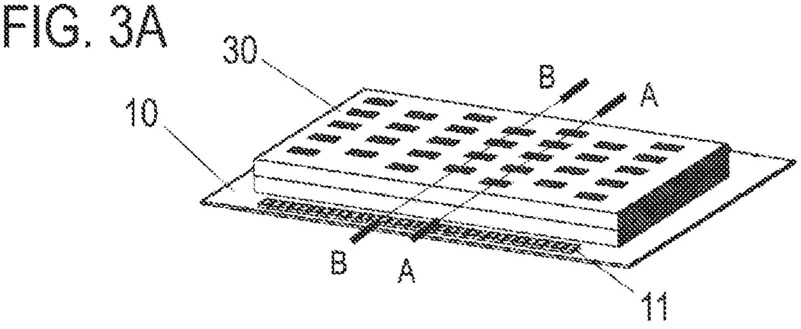
FIG. 3A to FIG. 3C are schematic diagrams illustrating an ink flow channel configuration in Embodiment 1 of the present invention.
Figure 3B:
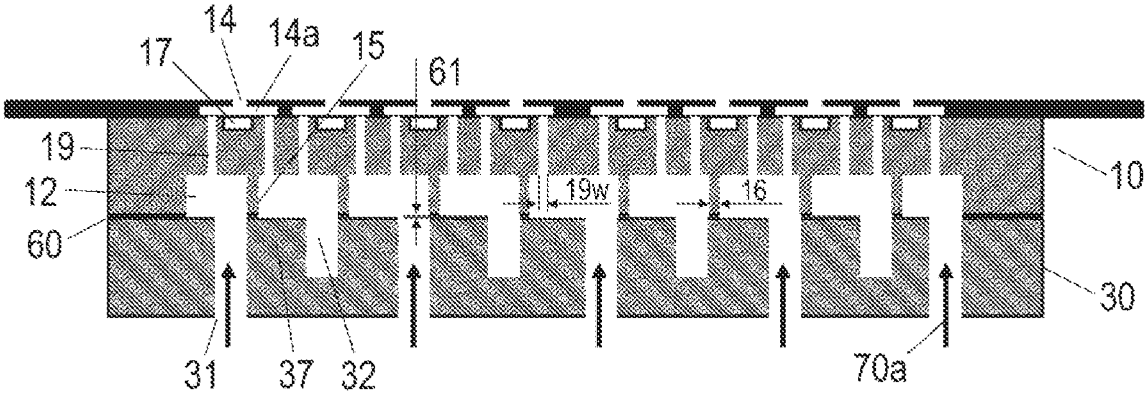
Figure 3C:
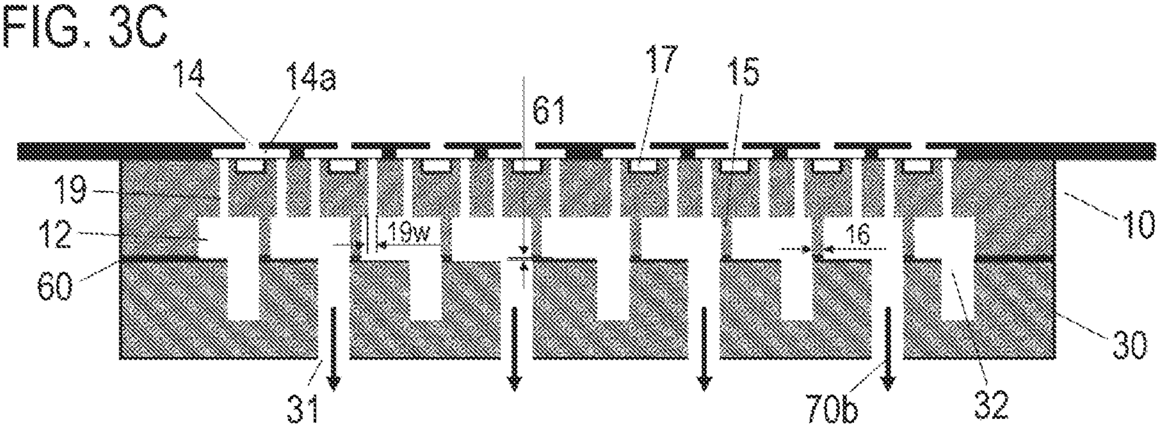

From openings 81 as ink supply ports, ink supplied from the ink tank (not shown) passes through ink flow channels demarcated within an ink flow channel member 80, an ink flow channel substrate 30, and a recording element substrate 10, and is ejected from ink ejection ports 14 (see, for instance, FIG. 3A to FIG. 3C). The ink is ejected from the ink ejection ports 14 by having received energy generated by ejection energy generating portions 17 (see, for instance, FIG. 3A to FIG. 3C) that are provided in the ink flow channels. The ink ejected from the ink ejection ports 14 adheres to an image recording surface of the recording material, disposed facing the ink ejection ports 14, and an image becomes formed (recorded) as a result on the recording material.

FIG. 1B is a schematic perspective-view diagram of the production process of the recording element unit 1, and depicts, in an exploded fashion, part of the configuration of the recording element unit 1. In the configuration of the recording element unit 1, FIG. 1B illustrates specifically a step in which the recording element substrate 10 as a first substrate (flow channel forming member), the ink flow channel substrate 30 as a second substrate (flow channel forming member), an ejection port surface cover 40, and an electrical wiring member 50 are integrated with each other. Prior to the integration illustrated in FIG. 1B, for instance, a respective flow channel structure (substrate production step) is formed, by etching of a silicon substrate, in the recording element substrate 10 and in the ink flow channel substrate 30.

The recording element substrate 10, which is produced in accordance with a silicon etching technique, has the ink ejection ports 14 (see, for instance, FIG. 3A to FIG. 3C) on the back surface side. A wafer having formed thereon the ejection energy generating portions 17 and electrode PADs 11 that are conductive with the ejection energy generating portions 17, as well as a wafer having formed therein the ink flow channels 12 that communicate with the ink ejection ports 14 (see for instance FIG. 3A to FIG. 3C), are joined to each other, and are then diced to yield individual recording element substrates 10.

Firstly, the ink flow channel substrate 30 for forming ink flow channels through which ink is supplied to the recording element substrate 10 is stacked on and joined to the recording element substrate 10 (stacking step). In the ink flow channel substrate 30, flow channel openings are formed at the joining surface (bonding surface) with the recording element substrate 10, and at the surface on the reverse side therefrom, so as to communicate with the ink flow channels 12 formed in the recording element substrate 10.

Drive ICs 20 for generating and outputting an electric signal for ink ejection are electrically mounted on the electrical wiring member 50 that is connected to the main body of a printer. A flexible wiring board that utilizes a polyimide in a base film and in a cover film is used as the electrical wiring member 50 in the present embodiment. The electrical wiring member is not limited to a specific member, and may be selected as appropriate, for instance, from among printed wiring boards.

Next, the ejection port surface at which there are opened the ink ejection ports 14 (see, for instance, FIG. 3A to FIG. 3C) of the recording element substrate 10 is joined to the ejection port surface cover 40 that is open so as to match the ink ejection ports 14, with further joining of the electrical wiring member 50 having the drive ICs 20 mounted thereon. In the present embodiment alumina is used as the ejection port surface cover 40, but the material is not limited thereto, and may be modified as appropriate to a metal member or the like.

FIG. 1C is a schematic perspective-view diagram of the production process of the recording element unit 1, and depicts, in an exploded fashion, part of the configuration of the recording element unit 1. FIG. 1C illustrates a step of electrically connecting the recording element substrate 10 and the electrical wiring member 50 having been integrated with each other in the step of FIG. 1B. Specifically, the electrode PADs 11 provided on the recording element substrate 10 joined to the ejection port surface cover 40, and the electrode PADs 21 provided on the drive ICs 20 mounted on the electrical wiring member 50, are electrically connected to each other by way of bonding wires 22.

FIG. 1D is a schematic perspective-view diagram of the production process of the recording element unit 1, and depicts, in an exploded fashion, part of the configuration of the recording element unit 1. FIG. 1D illustrates a step of protecting and covering the bonding wires 22 formed in the step of FIG. 1C, and further stacking and joining the ink flow channel member 80 as a third flow channel forming member.

Specifically, the electrically connected electrode PADs 11, 21 and the bonding wires 22 are covered with a sealing material 62. The electrical mounting means and configuration involved herein are not limited to those above, and can be modified as appropriate. For instance, the ejection port surface cover 40 may be electrically connected to the recording element substrate 10 directly, without joining of the electrical wiring member 50 and the drive ICs 20.

The ink flow channel member 80 is then joined to the ink flow channel substrate 30. The recording element unit 1 illustrated in FIG. 1A becomes formed as a result. In the ink flow channel member 80 there are formed flow channel openings at the joining surface (bonding surface) with the ink flow channel substrate 30, and at the surface on the reverse side therefrom, so as to communicate with first openings 31 formed in the ink flow channel substrate 30. In the present embodiment alumina is used as the ink flow channel member 80. The material is not limited thereto, and may be modified as appropriate to a metallic material or the like.

Embodiment 1

The recording element unit 1 according to Embodiment 1 of the present invention will be explained next with reference to FIG. 2A to FIG. 2C, FIG. 3A to FIG. 3C, FIG. 4A to FIG. 4C and FIG. 5A to FIG. 5C.

Figure 2A:
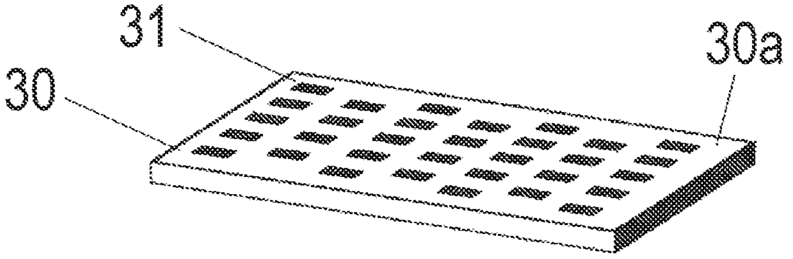
FIG. 2A to FIG. 2C are schematic diagrams illustrating the configuration of an ink flow channel substrate.
Figure 2B:
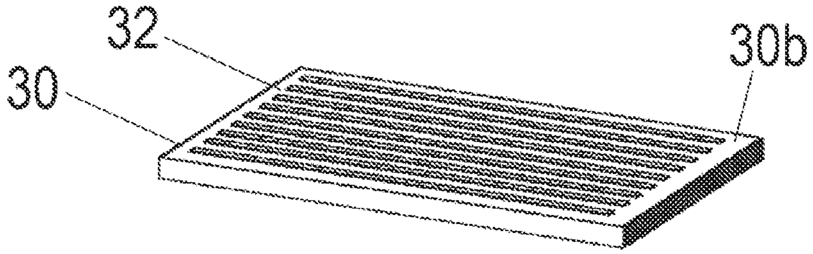
Figure 2C:
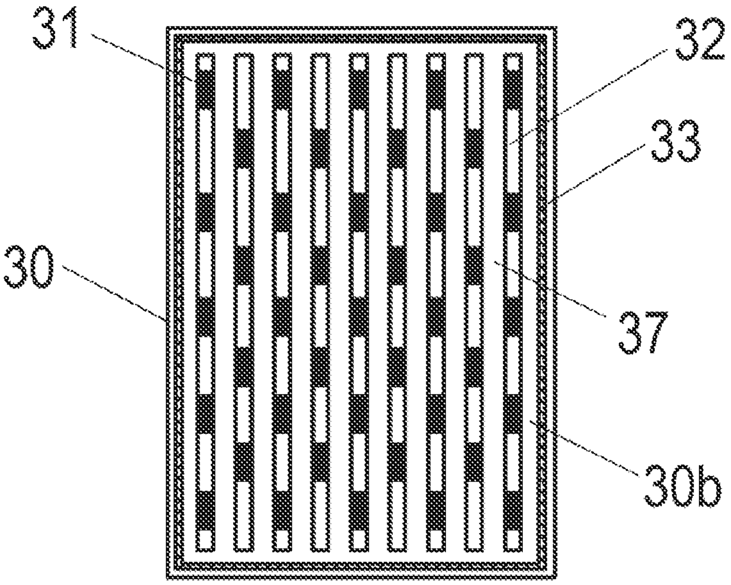

FIG. 2A is a schematic perspective-view diagram of the ink flow channel substrate 30 in a state where the surface thereof on the reverse side from that of the joining surface (bonding surface) with the recording element substrate 10 (joining surface with the ink flow channel member 80) faces upward. FIG. 2B is a schematic perspective-view diagram of the ink flow channel substrate 30 in a state in which the joining surface (bonding surface) thereof with the recording element substrate 10 faces upward. FIG. 2C is a schematic plan-view diagram illustrating the planar configuration of the ink flow channel substrate 30 in the present embodiment as viewed from the side of the joining surface with the recording element substrate 10. FIG. 3A, FIG. 3B and FIG. 3C are schematic diagrams illustrating a state in which ink flow channels are formed through joining of the recording element substrate 10 and the ink flow channel substrate 30 in the present embodiment.

Flow channels (first flow channels) demarcated in the recording element substrate 10 including the ink ejection ports 14, and flow channels (second flow channels) demarcated in the ink flow channel substrate 30 including the first openings 31 as ink supply ports, communicate with each other, as a result of substrate bonding, whereby the ink flow channels of the present embodiment become formed.

In the ink flow channel substrate 30, second openings 32 are formed at a joining surface (bonding surface) 30*b* (second surface) with the recording element substrate 10, and the first openings 31 are formed at a surface 30*a* (first surface) on the reverse side from that of the joining surface 30*b*. The first openings 31 and the second openings 32 communicate with each other within the ink flow channel substrate 30.

Specifically, multiple first openings 31 are arrayed, at intervals from each other, on the surface 30*a*, in a longitudinal direction (first direction) of the ink flow channel substrate 30, and in a transverse direction (second direction) perpendicular to the longitudinal direction. A configuration is adopted herein in which the second openings 32 have a groove shape extending in the longitudinal direction of the ink flow channel substrate 30 on the joining surface 30*b*, so that multiple first openings 31 are opened at intervals from each other in the same direction at the bottom of the grooves. That is, the second openings 32 are configured to link, to each other, the plurality of first openings 31 juxtaposed in the longitudinal direction of the ink flow channel substrate 30. The second openings 32 are provided juxtaposed parallelly to each other at intervals in the transverse direction of the ink flow channel substrate 30. Two given adjacent second openings 32 are partitioned by a respective partition wall 37 as a first partition wall extending in the longitudinal direction. Therefore, the multiple first openings 31 opened on the surface 30*a* on the reverse side from that of joining surface 30*b* communicate with the ink flow channels 12, provided in the recording element substrate 10, via any one of the plurality of second openings 32 opened on the side of the joining surface 30*b* with the recording element substrate 10. The ink flow channel substrate 30 has formed therein an annular joining region 33 with the recording element substrate 10, so as to surround the plurality of second openings 32 on the outer periphery of the joining surface 30*b*.

For its part, the recording element substrate 10 has provided therein ink flow channels 12 having a groove shape and extending in the longitudinal direction, on the joining surface (bonding surface) with the ink flow channel substrate 30, and multiple smallest flow channel portions 19 provided at the bottom of the grooves. The smallest flow channel portions 19 are flow channels having the smallest flow channel cross-sectional area from among the flow channels demarcated within the recording element substrate 10. The smallest flow channel portions 19 are linked to energy imparting flow channel portions 14*a* which are flow channel spaces, opposing the ejection energy generating portions 17 and the ink ejection ports 14, for imparting energy to the ink, so as to be ejected from the ink ejection ports 14. The ink flow channels 12 are juxtaposed parallelly to each other at intervals, in the transverse direction, so as to correspond to the second openings 32 of the ink flow channel substrate 30. Two given adjacent ink flow channels 12 are partitioned by a respective partition wall 15, as a second partition wall extending in the longitudinal direction. Two given ink flow channels 12 partitioned by one respective partition wall 15 communicate with each other via a respective energy imparting flow channel portion 14*a*.

An adhesive 60 is applied only to the outer periphery of the bonding surface of the recording element substrate 10 and the ink flow channel substrate 30, whereupon the recording element substrate 10 and the ink flow channel substrate 30 are pressed together, to thereby squash the adhesive 60, and bond the recording element substrate 10 and the ink flow channel substrate 30. As a result, ink flow channels become formed that elicit communication from the first openings 31 of the ink flow channel substrate 30 up to the ink ejection ports 14 of the recording element substrate 10. Each two ink flow channels 12 adjacent in the transverse direction and respective two second openings 32 are separated from each other by a respective partition wall 15 and by a respective partition wall 37 that are contiguous to each other in a substrate stacking direction.

The ink flowing through such ink flow channels is ejected from the ink ejection ports 14 on account of the energy generated by the ejection energy generating portions 17 in the energy imparting flow channel portions 14*a*. The concrete configuration of the ejection energy generating portions 17 is not limited to a specific configuration, but, for instance, piezoelectric elements may be provided such that the volume of the flow channels is modified through deformation of the piezoelectric elements, and pressure is generated as a result for ejecting the ink. Otherwise, for instance a scheme may be adopted in which electrothermal exchange elements are provided such that ink is heated to generate air bubbles which in turn cause the ink to be ejected.

The ink flow channels are circulation-type ink flow channels in which ink is caused to flow from the first openings 31 of the ink flow channel substrate 30 towards the ejection energy generating portions 17 of the recording element substrate 10 by an ink pressurizing unit (not shown), such that ink that is not ejected returns to the first openings 31. That is, two given ink flow channels 12 partitioned by one partition wall 15 communicate with each other via a respective energy imparting flow channel portion 14*a*; likewise, also two given second openings 32 partitioned by a respective partition wall 37 contiguous to the partition wall 15 communicate with each other. Therefore, as illustrated in FIG. 3B and FIG. 3C, ink can circulate and flow, via the energy imparting flow channel portions 14*a*, in the two given ink flow channels partitioned by a respective partition wall 15 and a respective partition wall 37 which are contiguous to each other in the stacking direction of the recording element substrate 10 and the ink flow channel substrate 30.

FIG. 3B is a cross-sectional diagram along A-A in FIG. 3A, depicting paths (arrows 70*a*) along which ink flows from the first openings 31 of the ink flow channel substrate 30 towards the vicinity of the ejection energy generating portions 17. FIG. 3C is a B-B cross-sectional diagram along B-B in FIG. 3A, depicting paths (arrows 70*b*) along which non-ejected ink returns from the vicinity of the ejection energy generating portions 17 to the first openings 31 of the ink flow channel substrate 30. Ink circulation in the liquid flow channels is not an essential configurational requirement of the present invention, and the invention can be similarly adopted also in an ink flow channel configuration where no circulation takes place.

In the present embodiment an ink flow channel partition wall width 16, which is the thickness of the partition walls 15, ranges from 100 μm to 200 μm. In a case where the partition walls 15 are joined to the ink flow channel substrate 30 (partition walls 37) using an adhesive, a concern arises in that the ink flow channels may become blocked by spreading adhesive. In the present embodiment, therefore, a region excluding the opposing region between the partition walls 15 and the partition walls 37, specifically the outer peripheral region of the bonding surface of the recording element substrate 10 and the ink flow channel substrate 30, serves as the joining region on which the adhesive is applied, in the bonding surface. Blockage of the ink flow channel on account of adhesive spread can be suppressed as a result, without an increase in chip surface area. The recording element substrate 10 and the ink flow channel substrate 30, which are formed by silicon etching, are finished with high precision in respective joining planes. As a result, a gap 61 which is a facing distance, in the stacking direction, between each partition wall 15 and the ink flow channel substrate 30 (partition walls 37) can be minimized by squashing, as thinly as possible, the adhesive that is applied only to the outer peripheral portion of the bonding surface. The gap 61 between each partition wall 15 and the ink flow channel substrate 30 (partition walls 37) depends on physical properties, such as the particle size of the filler contained in the adhesive 60 that is used, as well as viscoelasticity and curing shrinkage.

In the present embodiment, the gaps 61 between the partition walls 15 and the partition walls 37 is from 0 to 25 μm, i.e., is 25 μm or smaller, as a predetermined facing distance.

Under the premise that a same type of ink is used, fluid resistance in the ink flow channels is generally defined by Expression (1) using a hydraulic diameter dh according to flow channel width, and on the basis of a flow channel cross-sectional area A and the wet edge length (peripheral length of the cross section) S of the relevant portion.

$$dh=4A/S \tag{1}$$

In the scope of application of the present invention it suffices that a hydraulic diameter dh1 of the smallest flow channel portions 19 and a hydraulic diameter dh2 of the gaps 61 between the partition walls 15 and the partition walls 37 satisfy the relationship of Expression (2).

$$dh1>dh2 \tag{2}$$

Figures 9A, 9B:
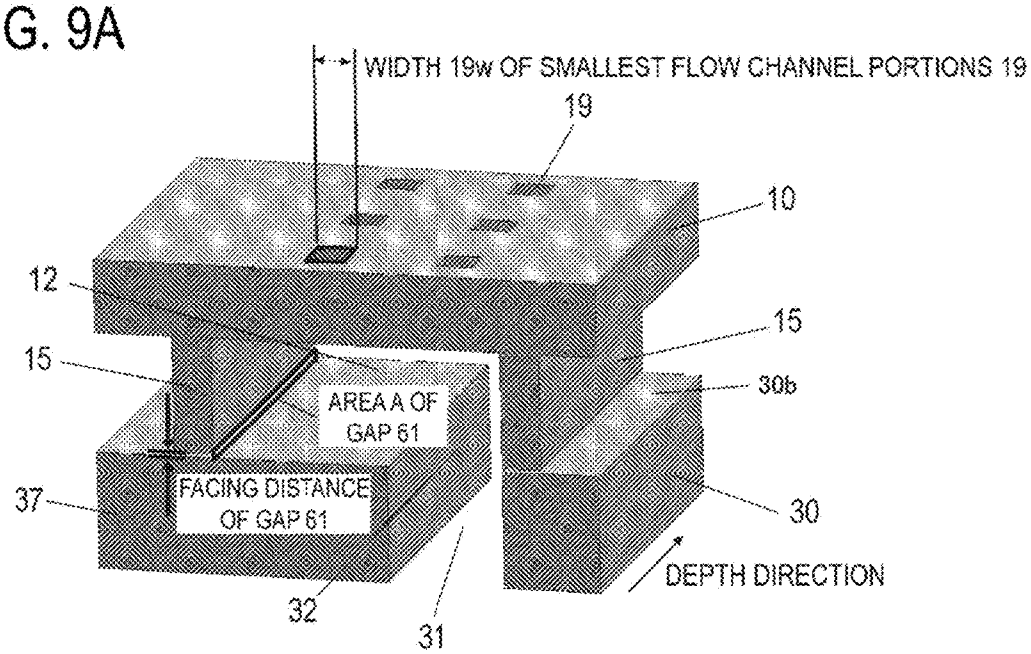

FIG. 9A to FIG. 9C illustrate the hydraulic diameter dh1 of the smallest flow channel portions 19 and the hydraulic diameter dh2 of the gap 61 in the recording element unit 1 according to the present embodiment. As illustrated in FIG. 9A to FIG. 9C, in the present embodiment, the smallest flow channel portions 19 are 60 μm×60 μm squares having a width 19*w*. The distance in the depth direction (longitudinal direction of ink flow channel substrate 30) in FIG. 3B and FIG. 3C, of the gaps 61 between the partition walls 15 and the partition walls 37, is assumed herein to be 25 mm (=25000 μm). That is, among the gaps between the bonding surfaces of the ink flow channel substrate 30 and of the recording element substrate 10, the gaps 61 between the partition walls 15 and the partition walls 37 are long in the longitudinal direction, as corresponding to the second openings 32 and the ink flow channels 12, and very narrow in the transverse direction. The hydraulic diameters in this region are thus prescribed in the present embodiment. In a calculation premised on the above, the hydraulic diameter dh1 in the smallest flow channel portions 19 is 60 and the hydraulic diameter dh2 at the part of the gaps 61 between the partition walls 15 and the partition walls 37 is 50, and thus the relationship of Expression (2) is satisfied.

The smaller the value of the hydraulic diameter of the gaps 61 between the partition walls 15 and the partition walls 37 relative to the hydraulic diameter of the smallest flow channel portions 19, i.e., the smaller the hydraulic diameter, the greater becomes the resistance to a fluid, and accordingly ink flows more readily in the smallest flow channel portions 19 than in the gap 61. That is, by satisfying the relationship of Expression (2), leakage of ink from the gaps 61 can be sufficiently suppressed, even without interposition of an adhesive, such that neither the flow of ink to the vicinity of the ejection energy generating portions 17 nor circulation of ink within the flow channels is hampered. Also, a problem in terms of product functionality does not arise even in the hypothetical case of small leaks from the gaps 61 at the flow channel partition walls, since the same type of ink flows in the ink flow channels.

The value of the ink flow channel partition wall width, the value of the gap between flow channel partition walls, and the value of a minimum ink flow channel width are not limited to those given above, and can be modified as appropriate in accordance with various design conditions such as the physical properties of the ink, the material of the ink flow channel member, and the internal pressure of the flow channels involved in ink flow. The material of the ink flow channel substrate 30 is not limited to silicon, and, for instance, polished metals or ceramics can be used as appropriate herein as the material of the ink flow channel substrate 30, so long as the flatness of the joining plane thereof with the recording element substrate 10 is established with respect to the allowable gap of the flow channel partition walls.

Figure 4A:
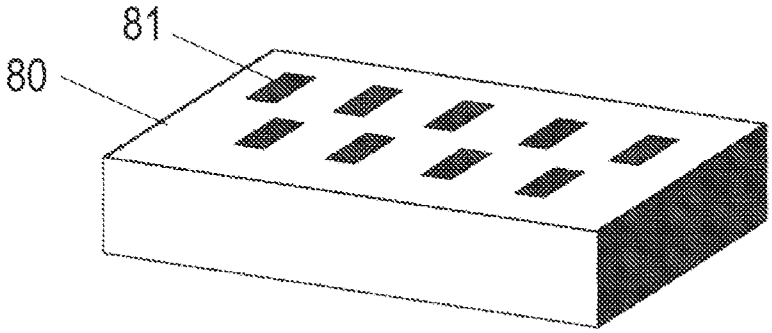
FIG. 4A to FIG. 4C are schematic diagrams illustrating the configuration of an ink flow channel member.
Figure 4B:
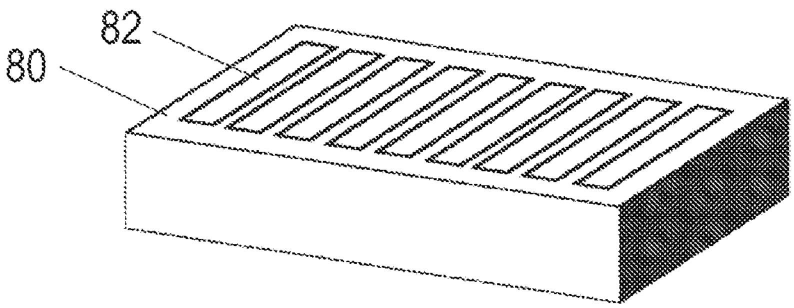
Figure 4C:
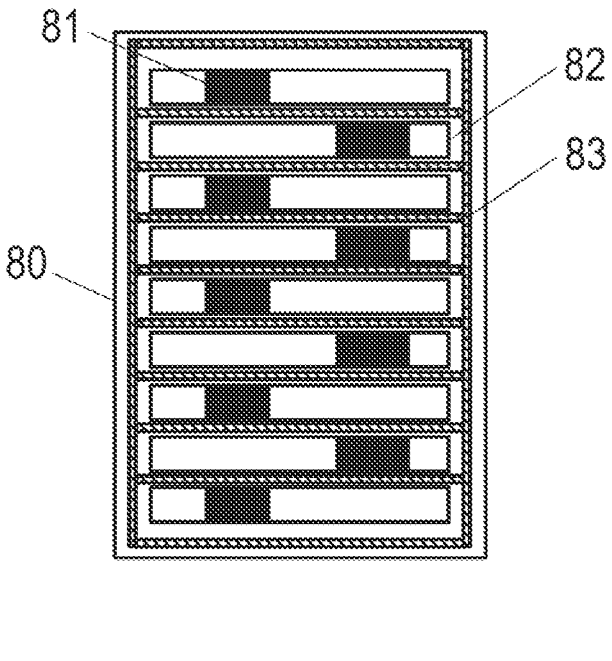
Figure 5A:
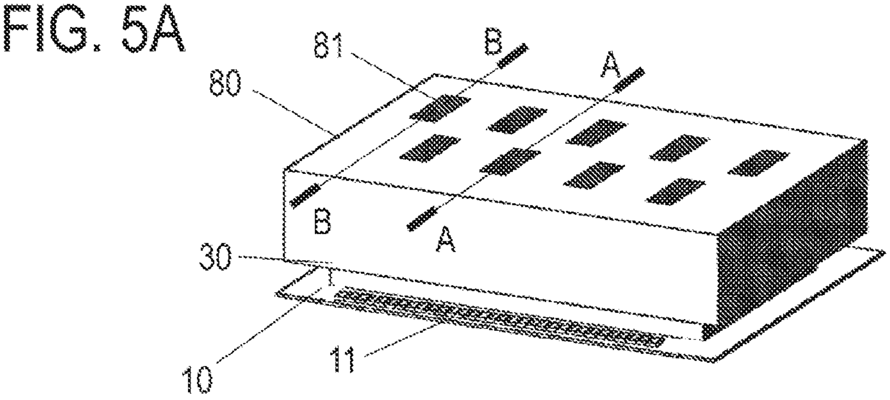
FIG. 5A to FIG. 5C are schematic diagrams of an ink flow channel configuration by an ink flow channel substrate and an ink flow channel member.
Figure 5B:
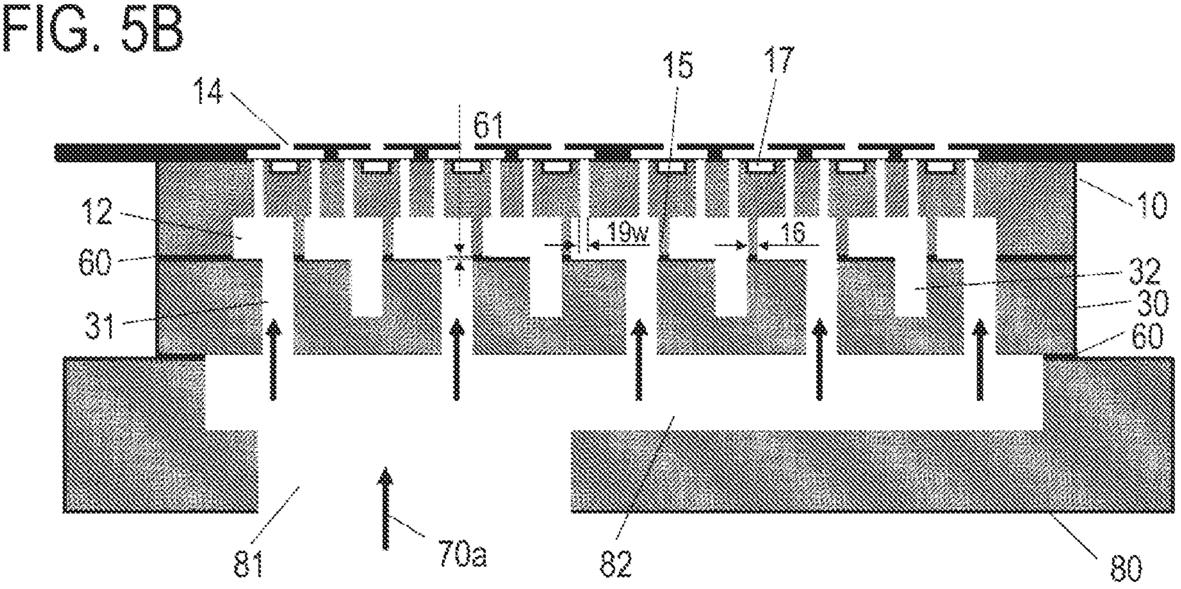
Figure 5C:
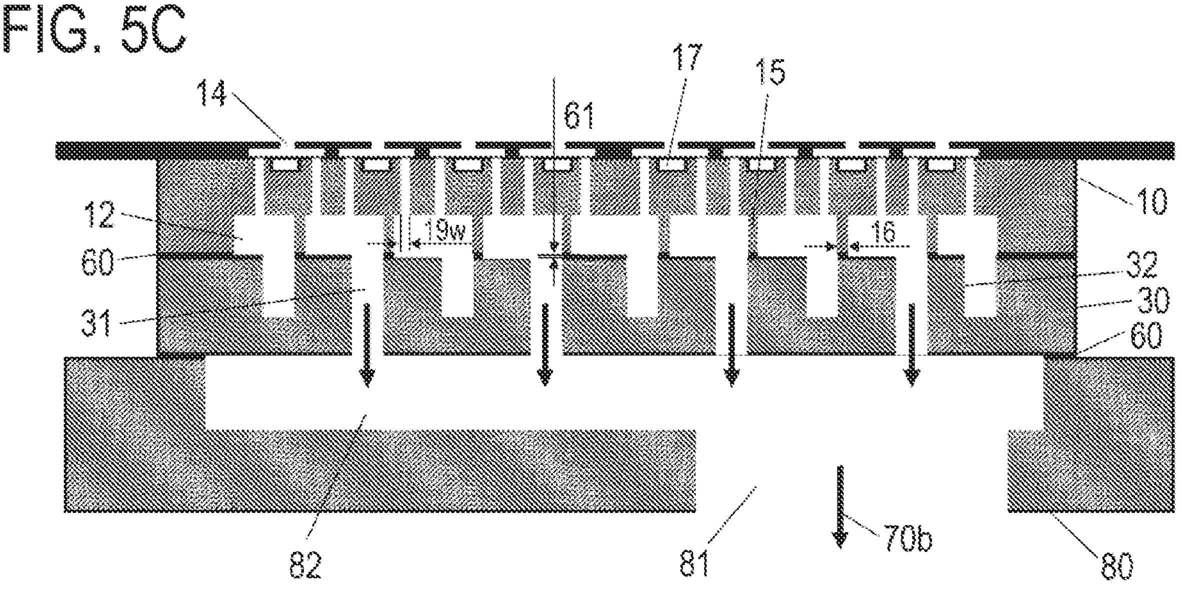

FIG. 4A is a schematic perspective-view diagram of the ink flow channel member 80 in a state where the surface (first surface) thereof on the reverse side from that of the joining surface with the ink flow channel substrate 30 is facing upward. FIG. 4B is a schematic perspective-view diagram of the of the ink flow channel member 80 in a state where the joining surface (second surface) thereof with the ink flow channel substrate 30 is facing upward. FIG. 4C is a schematic plan-view diagram illustrating the planar configuration of the ink flow channel member 80 of the present embodiment as viewed from the side of the joining surface with the ink flow channel substrate 30. FIG. 5A, FIG. 5B and FIG. 5C are schematic diagrams illustrating a state in which ink flow channels have become formed through joining of the ink flow channel substrate 30 and the ink flow channel member 80 of the present embodiment.

In the ink flow channel member 80, second openings 82 are formed in the joining surface with the ink flow channel substrate 30, and first openings 81 are formed on the reverse side from the foregoing. Also, the first openings 81 and the second openings 82 communicate within the ink flow channel member 80. The formation pitch of the first openings 81 and the second openings 82 is larger than the formation pitch of the openings 31 and 32 of the ink flow channel substrate 30, and has herein the role of widening the ink flow channel pitch. A joining region 83 of the ink flow channel member 80 denotes herein a region that is made up of regions between the second openings 82, being elongated regions in the transverse direction of the ink flow channel member 80 and being parallelly juxtaposed with each other, at intervals, in the longitudinal direction, and a region of the outer peripheral portion that surrounds the totality of the second openings 82. An adhesive is applied to the ink flow channel substrate 30 or the ink flow channel member 80 so that the adhesive spreads to the joining region 83, to join the ink flow channel substrate 30 and the ink flow channel member 80 together.

Similarly to FIG. 3B, herein FIG. 5B is a cross-sectional diagram along A-A of FIG. 5A, depicting paths (arrows 70*a*) along which ink flows towards the vicinity of the ejection energy generating portions 17. Similarly to FIG. 3C, herein FIG. 5C is a cross-sectional diagram along B-B in FIG. 5A, depicting paths (arrows 70*b*) along which non-ejected ink returns from the vicinity of the ejection energy generating portions 17 to the first openings 81 of the ink flow channel member 80. The second openings 82 of the ink paths illustrated in the cross section A-A and the cross section B-B are separated by an adhesive (not shown). Although the recording element unit 1 in the present embodiment has three ink flow channel forming members, the number of constituent flow channel forming members is not limited thereto, and it can be increased or reduced as appropriate, for instance, depending on the required flow channel pitch and the designed configuration.

Thus, the present embodiment allows suppressing blockage of ink flow channels derived from adhesive spread, without incurring an enlargement in chip surface area. It becomes therefore possible to improve the reliability of the recording performance of the recording apparatus.

Embodiment 2

A recording element unit according to Embodiment 2 of the present invention will be explained with reference to FIG. 6. The basic configuration and operation of the recording element unit of Embodiment 2 are identical to those of Embodiment 1. Accordingly, elements in Embodiment 2 having functions and configurations identical or corresponding to those in Embodiment 1 will be denoted with identical reference symbols, and a detailed explanation thereof will be omitted. Features not specifically explained in Embodiment 2 are identical to those in Embodiment 1.

Figure 6:
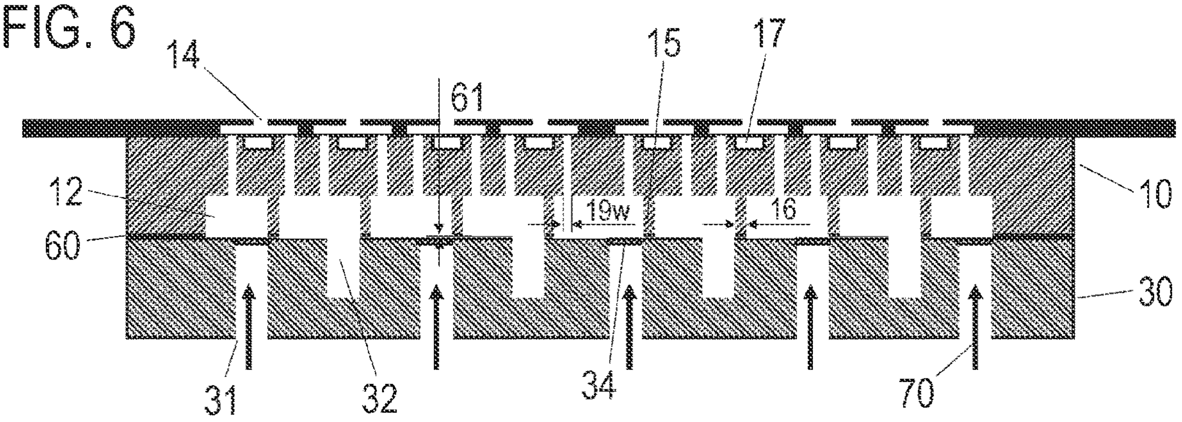
FIG. 6 is a schematic diagram illustrating an ink flow channel configuration in Embodiment 2 of the present invention.

FIG. 6 is a schematic cross-sectional diagram illustrating a state in which ink flow channels have become formed through joining of the recording element substrate 10 and the ink flow channel substrate 30 of Embodiment 2. In contrast to Embodiment 1, filters 34 are now formed in the ink flow channels of the ink flow channel substrate 30. The function of the filters 34 is to block dirt having intruded into the respective ink flow channels, to thereby suppress clogging of the ink ejection ports, and suppress defective ink ejection.

For instance, in the ink flow channel substrate 30 and the recording element substrate 10 formed through bonding of a plurality of silicon wafers, the filters 34 can be formed by opening, relying on silicon etching, through-holes that are smaller than the ink flow channels, in at least one of the bonded wafers, at portions corresponding to ink flow channels. Besides silicon etching, other methods may be resorted to as appropriate that involve, for instance, forming through-holes smaller than the ink flow channels, using a photosensitive resin and relying on photolithography, in the silicon wafers that form the ink flow channel substrate 30 and the recording element substrate 10.

The filters 34 are not limited to the form illustrated in FIG. 6, and, for instance, the filters 34 may be formed also in ink flow channel component parts such as the recording element substrate 10 and the ink flow channel member 80.

Thus, the present embodiment elicits the same effects as Embodiment 1, and moreover allows preventing impairment of reliability derived from intrusion of dirt into the ink flow channels.

Embodiment 3

A recording element unit according to Embodiment 3 of the present invention will be explained with reference to FIG. 7. The basic configuration and operation of the recording element unit of Embodiment 3 are identical to those of Embodiment 1. Accordingly, elements in Embodiment 3 having functions and configurations identical or corresponding to those in Embodiment 1 will be denoted with identical reference symbols, and a detailed explanation thereof will be omitted. Features not specifically explained in Embodiment 3 are identical to those in Embodiment 1.

Figure 7:
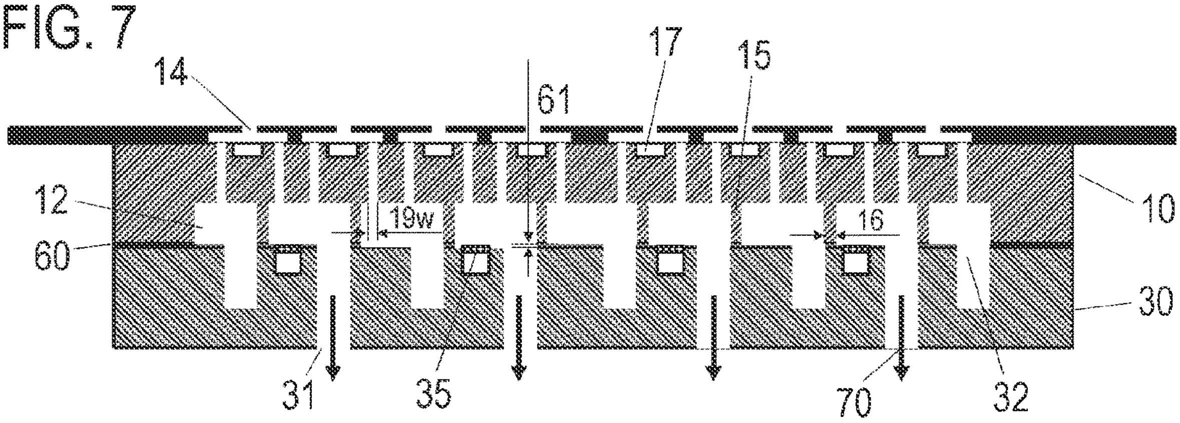
FIG. 7 is a schematic diagram illustrating an ink flow channel configuration in Embodiment 3 of the present invention.

FIG. 7 is a schematic cross-sectional diagram illustrating a state in which ink flow channels have become formed through joining of the recording element substrate 10 and the ink flow channel substrate 30 of Embodiment 3. In contrast to in Embodiment 1, damper films 35 are now formed in the ink flow channels of the ink flow channel substrate 30. Through the action of the damper films 35, the ejection driving force that is applied to the ink from the ejection energy generating portions 17 propagates within the flow channels, so that adverse effects on ink ejection can be suppressed as a result.

The damper films 35 can be formed, for instance, through formation of a film of polyimide or the like in openings that are formed through opening, by silicon etching, of through-holes in the recording element substrate 10 and the ink flow channel substrate 30 having been formed through bonding of a plurality of silicon wafers. The damper films 35 are not limited to a polyimide film, and a similar configuration can be achieved by forming elastic films in the ink flow channel substrate 30 and the recording element substrate 10.

The damper films 35 are not limited to the form illustrated in FIG. 7, and, for instance, the damper films 35 may be formed also in ink flow channel component parts such as the recording element substrate 10 and the ink flow channel member 80.

Thus, the present embodiment elicits the same effects as Embodiment 1, and moreover allows controlling flow characteristics within the ink flow channels in accordance with the physical properties of the ink that is used.

Embodiment 4

Embodiment 4 of the present invention will be explained next with reference to FIG. 8A and FIG. 8B. The basic configuration and operation of the recording element unit of Embodiment 4 are identical to those of Embodiment 1. Accordingly, elements in Embodiment 4 having functions and configurations identical or corresponding to those in Embodiment 1 will be denoted with identical reference symbols, and a detailed explanation thereof will be omitted. Features not specifically explained in Embodiment 4 are identical to those in Embodiment 1.

Figure 8A:
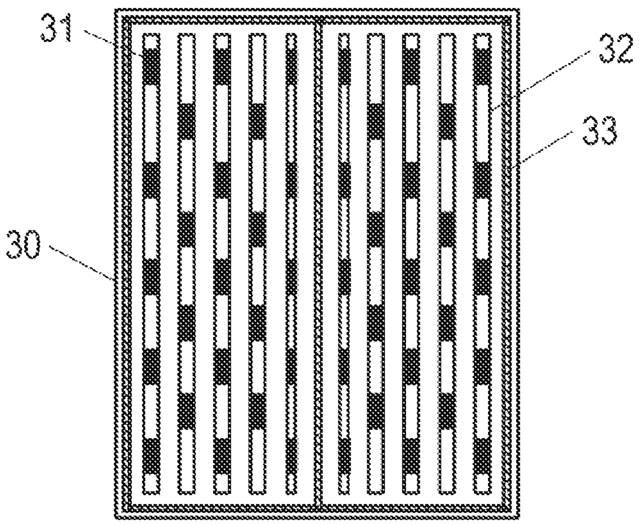
FIG. 8A and FIG. 8B are schematic diagrams illustrating an ink flow channel configuration in Embodiment 4 of the present invention.
Figure 8B:
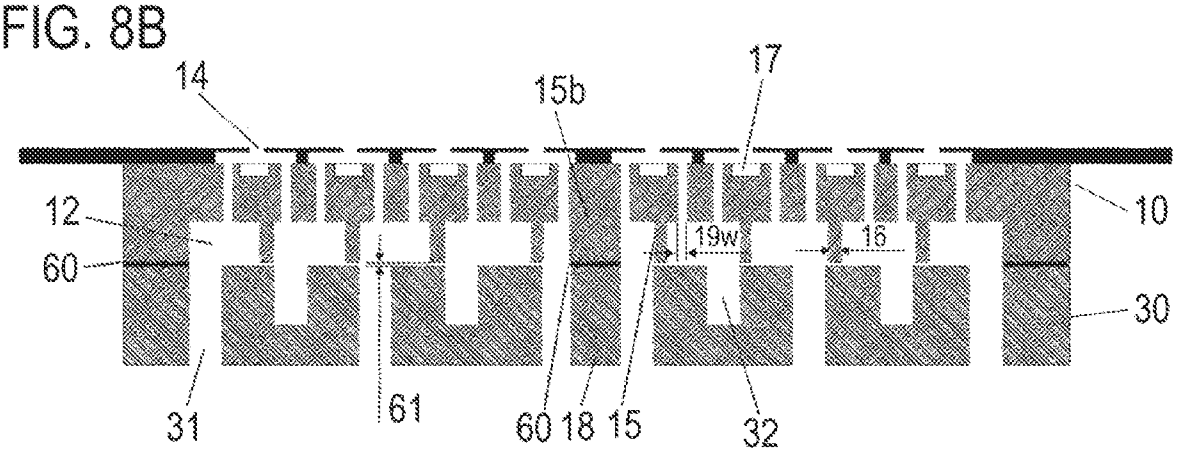

FIG. 8A is a schematic plan-view diagram illustrating the ink flow channel substrate 30 of Embodiment 4 of the present invention. FIG. 8B is a schematic cross-sectional diagram illustrating a state in which ink flow channels are formed through joining of the recording element substrate 10 and the ink flow channel substrate 30 of Embodiment 4. In contrast to Embodiment 1, in Embodiment 4 partition walls between ink flow channel colors are provided in the recording element substrate 10 and the ink flow channel substrate 30. Specifically, the types (colors or the like) of ink supplied from the plurality of first openings 31 are set to be different from each other, and the ink flow channels (liquid flow channels) formed between the recording element substrate 10 and the ink flow channel substrate 30 are divided in such a manner that multiple ink flow channels are formed, independently from each other, for each type of ink. For instance, a partition wall 15*b* as a third partition wall is provided in the recording element substrate 10, while a partition wall 18 as a fourth partition wall is provided in the ink flow channel substrate 30, so as to be contiguous with the partition wall 15*b* in the stacking direction. An adhesive 60 is interposed between the partition wall 15*b* and the partition wall 18, to thereby join the foregoing to each other. In this configuration the liquid flow channels can be divided for each type of ink, such that, upon deployment of the art of the present invention in a recording apparatus having a multi-color head, an implementation can be realized in which mixing of multiple types of ink is suppressed. The width (thickness) of the partition wall 15*b* and the partition wall 18 in the present embodiment is set to a value of 300 μm or larger, with spread of the adhesive 60 in mind. This value can be modified as appropriate by providing a region through which spreading adhesive runs off.

Thus, the present embodiment elicits the same effects as Embodiments 1 to 3, and moreover allows forming highly reliable ink flow channels corresponding to inks of a plurality of types. In consequence, the present embodiment allows improving the reliability of ink ejection, and therefore, also improving the reliability of the recording performance of the recording apparatus. The present embodiment is not limited to the form illustrated in FIG. 8A and FIG. 8B, and a similar configuration can be applied to various flow channel shapes.

The configurations illustrated in the above embodiments can be combined with each other so long as no technical contradictions arise in doing so.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056073, filed on Mar. 30, 2022, which is hereby incorporated by reference herein in its entirety.

What is claimed is:

1. A liquid ejection recording element unit comprising:

a first substrate having a first partition wall and an energy generating portion, such that the first partition wall demarcates a first flow channel including a plurality of ejection ports for ejection of a liquid for image recording, and the energy generating portion generates energy for ejecting the liquid from the first flow channel via the ejection ports; and a second substrate provided with a second partition wall that demarcates a second flow channel including a supply port for supplying the liquid, the second substrate being stacked on and joined to the first substrate, via an adhesive, so that the second flow channel communicates with the first flow channel, wherein the first partition wall and the second partition wall are contiguous across a gap of a predetermined facing distance, with no interposed adhesive, in the stacking direction of the first substrate and the second substrate, and wherein a hydraulic diameter of the gap is shorter than a hydraulic diameter of a smallest flow channel portion having a minimum flow channel cross-sectional area in the first flow channel.

2. The liquid ejection recording element unit according to claim 1, wherein the first substrate and the second substrate are silicon substrates.

3. The liquid ejection recording element unit according to claim 1, wherein a thickness of a part of the first partition wall that forms the gap is from 100 μm to 200 μm.

4. The liquid ejection recording element unit according to claim 1, wherein the predetermined facing distance is 25 μm or shorter.

5. The liquid ejection recording element unit according to claim 1, wherein the first substrate and the second substrate are joined via an adhesive that is applied only on an outer peripheral portion of a bonding surface.

6. The liquid ejection recording element unit according to claim 1, wherein a liquid flow channel is configured to communicate from the supply port, via the second flow channel and the first flow channel, to the plurality of ejection ports; and the liquid flow channel is configured to allow liquid that is not ejected from the plurality of ejection ports to circulate through the interior of the liquid flow channel.

7. The liquid ejection recording element unit according to claim 6, further comprising a filter provided in the liquid flow channel.

8. The liquid ejection recording element unit according to claim 6, further comprising a damper film provided in the liquid flow channel.

9. The liquid ejection recording element unit according to claim 1, wherein the second substrate comprises a plurality of the supply ports, and wherein the liquid supplied from each of the plurality of the supply ports is a liquid of identical type.

10. The liquid ejection recording element unit according to claim 1, wherein the second substrate comprises a plurality of the supply ports, wherein a liquid flow channel is configured to communicate from a plurality of the supply ports, via the second flow channel and the first flow channel, to the plurality of ejection ports, and the liquid flow channel is divided into a plurality of the liquid flow channels corresponding to the type of the liquid supplied from each of the plurality of the supply ports, wherein the first substrate has a third partition wall that divides the first flow channel into a plurality of the first flow channels, and divides the plurality of ejection ports so as to correspond to the divided plurality of the first flow channels, wherein the second substrate has a fourth partition wall that divides the second flow channel into a plurality of second flow channels so as to correspond to the divided plurality of the first flow channels, and wherein the third partition wall and the fourth partition wall are contiguous by being joined to each other via an adhesive, in the stacking direction.

11. The liquid ejection recording element unit according to claim 10, wherein a thickness of a part at which the third partition wall and the fourth partition wall are contiguous by being joined via the adhesive is longer than a thickness of a part of the first partition wall that forms the gap.

12. The liquid ejection recording element unit according to claim 10, wherein a thickness of a part at which the third partition wall and the fourth partition wall are contiguous by being joined via the adhesive is 300 μm or longer.

* * * * *